INVENTOR.
Willis Thomas Watkins
BY
ATTORNEY.

United States Patent Office 2,823,385
Patented Feb. 18, 1958

2,823,385

ATTACHING STRUCTURE FOR SPECTACLE FRAME SIDE SHIELDS

Willis Thomas Watkins, Hickman Mills, Mo., assignor to Parmelee Plastics Company, Kansas City, Mo., a corporation of Missouri Application August 16, 1954, Serial No. 450,059

1 Claim. (Cl. 2—13)

This invention relates to improvements in spectacles and particularly to the provision of a side shield having novel means for removably mounting the same on the lens frame of the spectacles, the said mounting means also being such as to permit swinging movement of the shields to and from a position superimposed upon the said frame.

It is the most important object of the instant invention to provide a shield of the aforementioned character that includes opposed ears receiving oppositely extending pintles on the lens frame for swingably mounting the shield on the frame.

Another important object of the instant invention is to provide in the said ears of the shield, novel slots or openings permitting removal of the shield from the frame by virtue of the inherent resiliency of the material from which the shield is made.

Still another object of this invention is to provide a shield that has an arcuate, innermost marginal edge or flange overlapping the frame when the shield is swung outwardly to its operative position and having a snap-hook engaging the frame for releasably holding the shield in such operative position.

Another object is to provide an arcuate stop on the shield engaging the inner edge of the frame when the snap-hook is in place engaging the outer edge of the frame.

Figure 1:
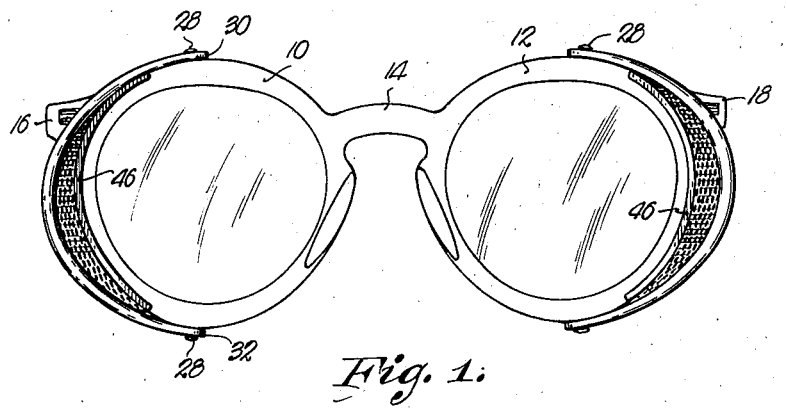
Figure 1 is a rear elevational view of a spectacle frame showing the side shields thereof made pursuant to the present invention.

The eyeglasses shown in the drawing may be quite conventional and include continuous frames 10 and 12 interconnected by bridge 14 and provided with opposed, outwardly extending bow mounts 16 and 18 respectively, in the usual manner, the bows not being illustrated in the drawing.

The arcuate, perforated side shields 20 and 22 illustrated in the drawing for lens frames 10 and 12 respectively, may be identical and are preferably formed from a suitable flexible material such as a synthetic plastic.

Each of the frames 10 and 12 is provided with a pair of opposed pintles 24 and 26 extending upwardly and downwardly in opposite directions and provided with heads 28. Similarly, each of the side shields 20 and 22 is provided with a pair of opposed ears 30 and 32 for receiving the pintles 24 and 26 and embracing the corresponding frame 10 and 12 in the overlapping and underlying relationship thereto. Each ear 30 and 32 is in turn provided with a slot or opening taking substantially the shape and form of a keyhole and including therefore, a hole 34 of sufficient diameter to clear the heads 28, together with an elongated slot portion 36. The slots 36 of the two ears 30 and 32 are narrower than the diameters of the heads 28 but sufficiently wide to receive the pintles 24 and 26 so as to permit free swinging movement of the shields 20 and 22 to and from the dotted line position shown in Fig. 2.

Figure 2:
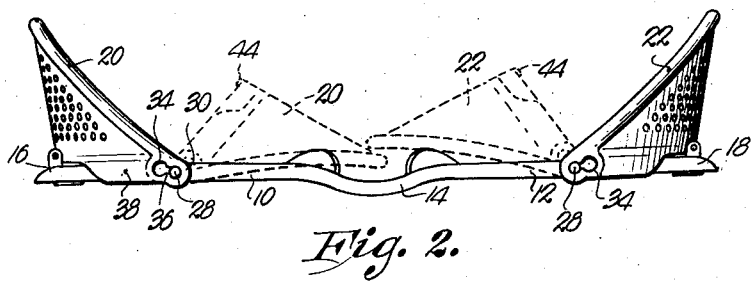
Fig. 2 is a top plan view showing the novel attaching means for side shields and illustrating the collapsed positions of the shields by dotted lines.
Figure 3:
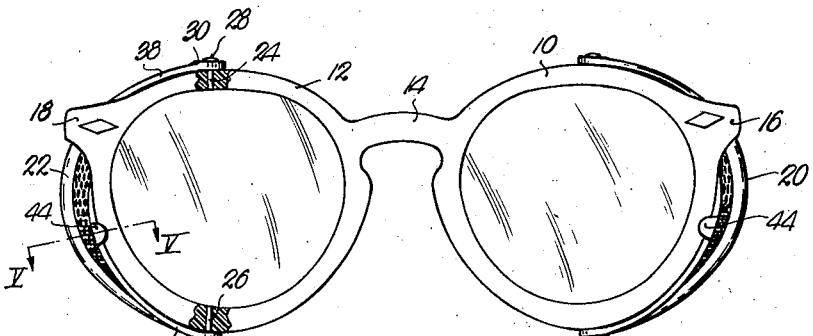
Fig. 3 is a front elevational view thereof.
Figure 4:
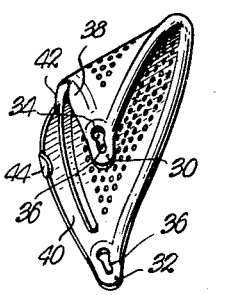
Fig. 4 is a perspective view of one of the shields entirely removed from the spectacle frame.
Figure 5:
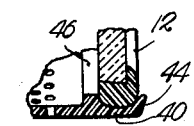
Fig. 5 is a fragmentary, detailed, cross-sectional view taken on line V—V of Fig. 3.

The pintles 24 and 26 are normally disposed within the slots 36 with the heads 38 overlapping the ears 30 and 32, and when the shields 20 and 22 are in the full-line, operative position, as shown in Figs. 1 to 3 inclusive, an arcuate, innermost, marginal flange 38—40 overlaps the corresponding frame 10—12. Shields 20 and 22 are, of course, cut away at 42 between the flange portions 38 and 40 to clear the bow mounts 16 and 18. A snap-hook 44 on the flange portion 40 engages the corresponding frame 10—12 to releasably hold the shields 20 and 22 in the operative position. Inasmuch as the shields 20 and 22 are made from resilient material, the hooks 44 are easily released when desired so that the shields 20 and 22 may be swung to the dotted-line position shown in Fig. 2, facilitating utilization of a spectacle case and otherwise carrying of the same when not in use.

The inherency of the material from which shields 20 and 22 are made also permits complete removal thereof from the frames 10 and 12 when desired. After release of the snap-hooks 44, the ears 30 and 32 may be shifted with respect to the frames 10—12 to dispose the pintles 24 and 26 in the openings 34. Thereupon, ears 30 and 32 may be sprung apart and be removed entirely from the pintles 24 and 26 since the openings 34 clear the heads 28. It is to be preferred that the slots 36 be relatively narrow adjacent the openings 34 to the end that the ears 30 and 32 will snap in place around the pintles 24 and 26 when the shields 20 and 22 are replaced on the frames 10 and 12.

Elongated, arcuate ribs or stops 46 on the inner faces of shields 20—22 bear against the inner edges of frames 10—12 to limit the extent of outward swinging movement of shields 20—22 when snap-hooks 44 are looped over the outer edges of the frames 20—22.

Having thus described the invention what is claimed as new and desired to be secured by Letters Patent is:

In combination with a pair of spectacles having a lens-receiving frame provided with a bow mount; a side shield for the frame entirely separate from said mount and provided with a pair of spaced ears embracing the frame; opposed, vertical pintles on the frame extending through the ears for swingably mounting the shield on the frame; a flange on one edge of the shield between the ears and overlapping the frame when the shield is at one end of its path of travel, said flange being cut away to clear said bow mount, there being an elongated, arcuate rib integral with the inner face of said shield and engageable with the frame for limiting the extent of outward swinging movement of the shield; and a resilient snap hook integral with the flange and normally looped over said frame for releasably holding the rib clamped against the frame.

References Cited in the file of this patent

UNITED STATES PATENTS

| 1,193,219 | Bader | Aug. 1, 1916 |
| 1,216,958 | Day | Feb. 20, 1917 |

FOREIGN PATENTS

| 330,725 | Great Britain | June 19, 1930 |
| 529,984 | Great Britain | Nov. 12, 1940 |